United States Patent [19]

Lecover

[11] Patent Number: 4,899,188

[45] Date of Patent: Feb. 6, 1990

[54] LIGHT SCATTERING OPTIC GUIDE

[76] Inventor: Maurice Lecover, 142 S. Kilkea Dr., Los Angeles, Calif. 90048

[21] Appl. No.: 294,263

[22] Filed: Jan. 3, 1989

[51] Int. Cl.⁴ .............................................. G03B 29/00
[52] U.S. Cl. ...................................... 354/75; 355/67; 350/96.1; 362/37
[58] Field of Search ....................... 354/75, 76, 77, 79, 354/80, 81, 126, 200; 355/61, 59, 65, 67, 37; 350/96.1; 362/32

[56] References Cited

U.S. PATENT DOCUMENTS

| | | | |
|---|---|---|---|
| 2,744,444 | 5/1956 | Breitman | 354/75 X |
| 3,899,245 | 8/1975 | Bernhardt | 354/75 X |
| 4,684,206 | 8/1987 | Bednorz et al. | 350/96.1 X |
| 4,730,883 | 3/1988 | Mori | 350/96.1 |

Primary Examiner—L. T. Hix
Assistant Examiner—Brian W. Brown
Attorney, Agent, or Firm—Erik M. Arnhem

[57] ABSTRACT

A light scattering optical guide supports a light source at one end and is coupled to the eyepiece of a single lens reflex camera at the other end. The camera is supported within a photorecorder. The light produced by the light source is coupled to the camera eyepiece by the light scattering optical guide in order to project a reticle upon the to-be-photographed object of the photorecorder.

12 Claims, 2 Drawing Sheets

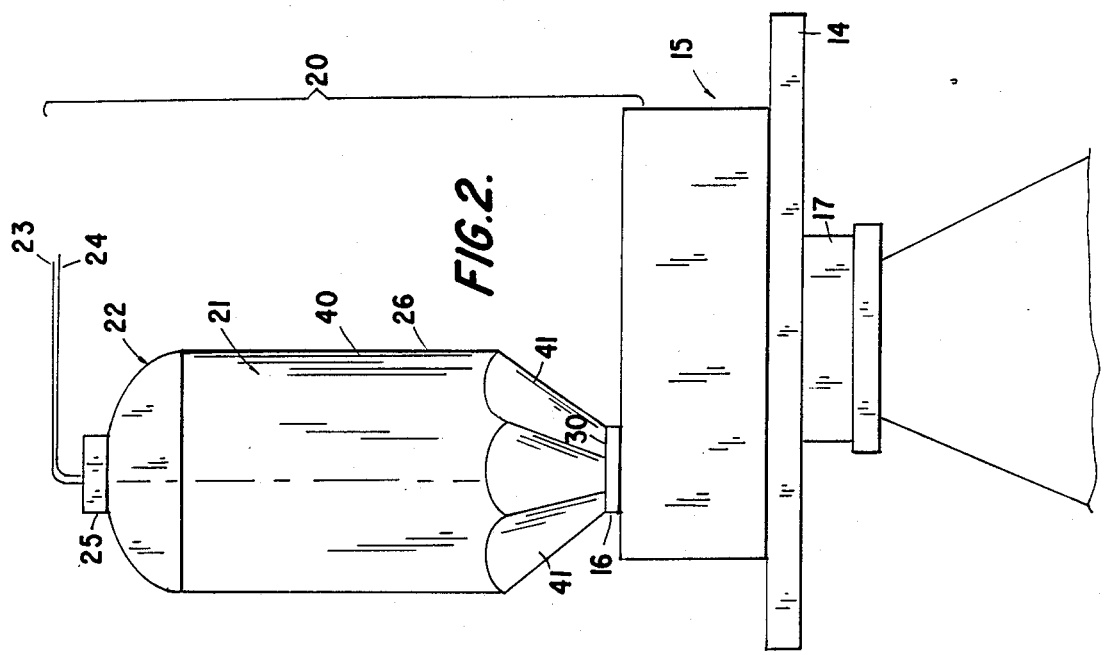
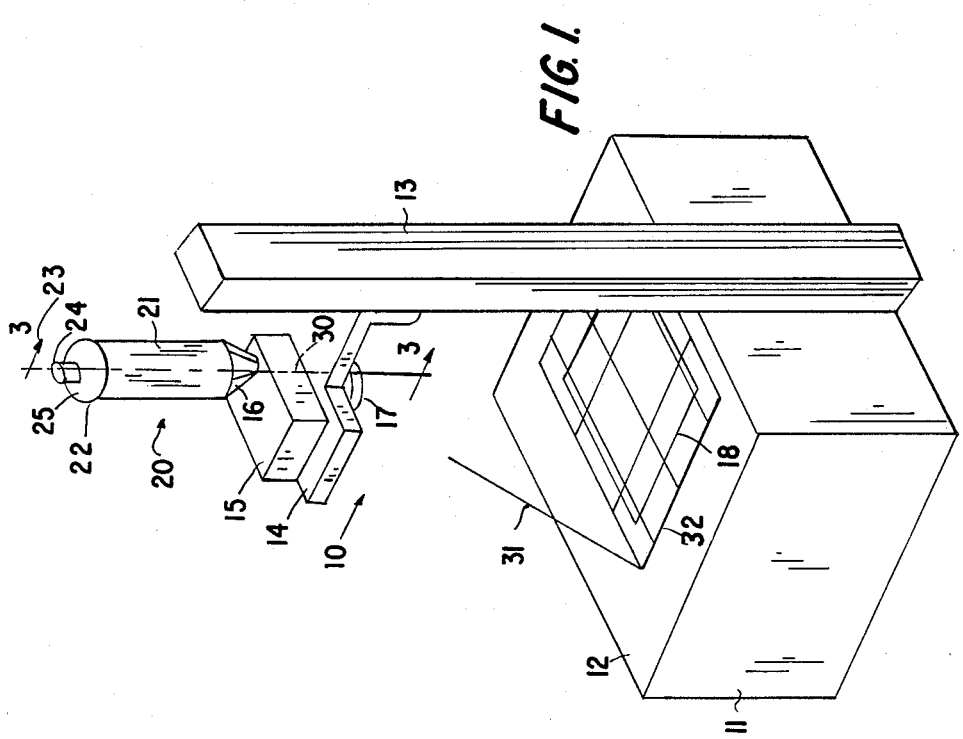

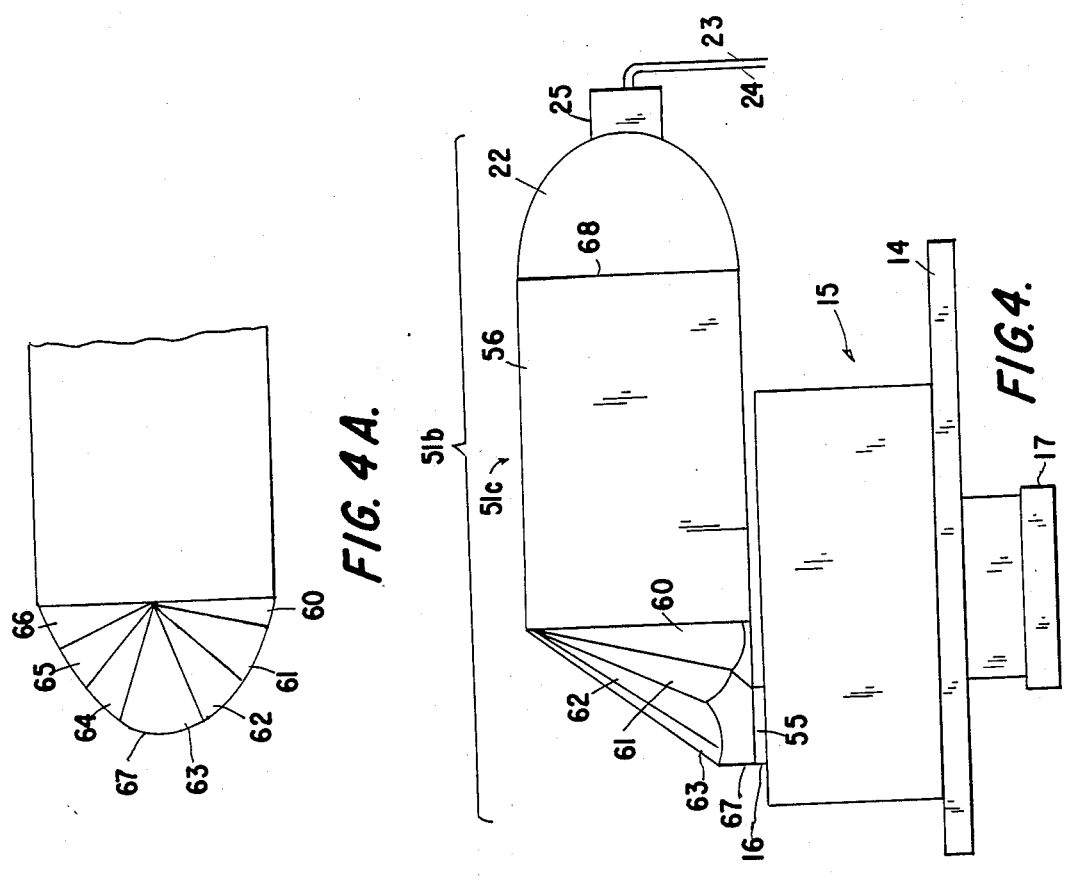
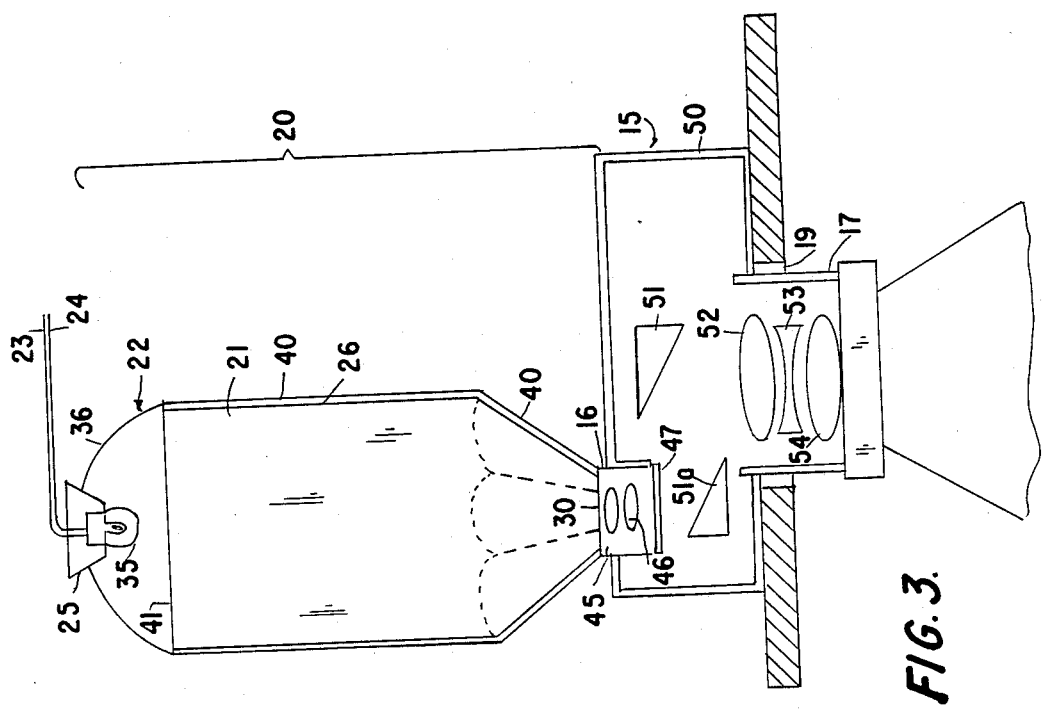

LIGHT SCATTERING OPTIC GUIDE

FIELD OF THE INVENTION

This invention relates generally to photographic systems and particularly to those utilizing a vertical camera stand employed to photograph objects or documents, or the like, positioned upon a photographic base.

BACKGROUND OF THE INVENTION

Within the broad field of photography there arise substantial uses of photographic systems which are employed to provide pictures of relatively small objects, often as small as a postage stamp, as well as various documents, charts, graphs, medical specimens and other similar material. In such projected photographic systems the intended use often includes research or documentation which is subject to exacting standards for accuracy, clarity and sharpness. To meet this need, practitioners in the art have developed various camera stands which are utilized to support& the to be photographed material and the imaging camera in a static controlled relationship to properly image and record the material.

While the particular constructions of such camera stands vary somewhat between manufacturers, generally all comprise a baseboard or light box upon which the to be photographed object is positioned together with a vertical column usually attached to one end of the baseboard and adapted to support the camera above the center of the baseboard. Means are provided either by motorized drives or hand operated drives to position the camera at different heights above the baseboard. In addition, most manufacturers provide one or more illuminating lights supported in proximity to the baseboard having means for adjustable position and illumination of the to be photographed material upon the baseboard.

In the majority of systems the camera supported above the baseboard comprises a single lens reflex camera which derives its name and preference by photographers from the fact that the viewing lens used by the photographer to frame the image actually views the image through the photographing lens. In other words, a single lens reflex camera, unlike viewfinder cameras or twin lens reflex cameras, utilizes the photographic lens to provide the image projected through the viewfinder.

In most other respects the photographic process carried forward using such camera stands is similar to that of other forms of photography in that the photographer while observing the to be photographed image through the viewfinder of the camera manipulates the height of the camera by the aforementioned height adjusting mechanisms such that the to be photographed object is properly framed within the cameras viewfinder. Thereafter, the lens is focused as the photographer views the to be photographed image through the viewfinder and other adjustments such as shutter speed and diaphragm opening are made. Typically during this process the position of the aforementioned illuminating sources are also adjusted to assure proper exposure of the to be photographed material.

While this procedure is satisfactory, it is subject to a substantial limitation in that the photographer must assume a position permitting a downward or lateral view through the viewfinder of the camera. As can be imagined, this substantially limits the height of the camera above the baseboard in most user situations. To avoid the need of having the photographer view the to be photographed image through the viewfinder and thereby avoid the limitation on the height of the camera above the baseboard, practitioners in the art have developed systems utilizing a method of framing of focusing often referred as "projected reticle focusing". In such projected reticle systems a light source and condenser lens combination are utilized to provide a source of illumination to be directed into the viewfinder of the camera. Because the optical system within the camera is bidirectional, light directed through the camera viewfinder is passed through the camera reticle or focusing screen and directed out through the focusing lens to ultimately illuminate the to be photographed object. As a result, an image of the focusing screen or reticle of the camera system is projected upon the baseboard and the to be photographed subject. With this projected image of the reticle upon the baseboard the camera height may be adjusted to properly frame the to be photographed object without viewing the object through the camera viewfinder. In addition, the camera lens focusing may be adjusted to sharply focus the focusing screen or reticle elements upon the to be photographed object resulting in proper focusing of the camera.

While the projected reticle system provides substantial improvement prior systems, in that the camera height may be increased beyond that which through the viewfinder focusing would otherwise permit, the system is subject to several limitations and creates undesired collateral effects. For example, because the viewfinder aperture is substantially small, a substantial amount of light must be projected through the camera to produce a useable reticle or focusing screen image upon the baseboard. This in turn requires a high wattage light source which in turn creates a prohibitive amount of heat. In addition, the previously used condenser lens systems often position this high powered light source prohibitively close to the camera thereby creating the possibility of damage to the camera and the film within it. In addition, the viewfinder optics are not designed to act as a projection system and therefore are not effective at evenly distributing the light source projected through the viewfinder. As a result, the illumination of the projected image is generally uneven and comprises one or more intense "hot spots" and other dark, less illuminated, areas. This lack of uniformity, of course, hinders the ability of the user to properly frame and focus the camera system.

In attempts to overcome the foregoing described limitations and problems of the prior systems, practitioners in the art have employed the use of fiber optic bundles to place the illumination source farther from the sensitive camera and film. While this reduction of heat in the region of the camera and film is of substantial improvement, the use of fiber optic bundles as light coupling mechanisms between the lamp and the viewfinder does not eliminate or improve the tendency to create intense hot spots and dark areas within the projected image; also limits the amount of light available.

There arises a need, therefore, for a reticle projection system which avoids the creation of excessive heat in the region of the camera and which provides an even bright illumination of the projected reticle or focusing screen upon the baseboard of a photographic system.

SUMMARY OF THE INVENTION

Accordingly, it is a general object of the present invention to provide an improved photographic system.

It is a more particular object of the present invention to provide an improved photographic system for use in projected reticle focusing of a photorecorder. It is a still more particular object of the present invention to provide an improved photographic system for use in a photorecorder in which substantially even illumination and increase in brightness. of a projected reticle or focusing screen upon the to be photographed object is provided.

In accordance with the invention, there is provided for use in combination with a single lens reflex camera having a viewfinder aperture and a camera lens aperture, a projecting light source comprising a source of illumination, a clear generally cylindrical coupling element defining a first end optically coupled to the source of illumination and a second end optically coupled to the viewfinder aperture of the camera. The coupling element further defines a reflective surface enclosing the coupling element over its entire outer surface except for the first and second end portions.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 is a perspective view of a photorecorder utilizing the present invention light scattering optic guide;

FIG. 2 is a detailed side view of a portion of the photorecorder and light scattering optic guide shown in FIG. 1;

FIG. 3 is a section view of the portion of the photorecorder and light scattering optic guide of the present invention taken along section lines 3—3 in FIG. 1; and FIGS. 4 and 4A show an alternate embodiment of the present invention light scattering optic guide.

DESCRIPTION OF THE PREFERRED EMBODIMENTS

FIG. 1 sets forth a perspective view of a photorecorder generally referenced by numeral 10 comprising a rigid base 11 defining an upper baseboard surface 12 upon which a to-be-photographed object 18 is positioned. Photorecorder 10 further defines a vertical stand 13 secured to base 11 by conventional fabrication techniques (not shown). A camera support 14 is moveably secured to stand 13 in accordance with general photorecorder construction techniques. It should be understood that in accordance with conventional photorecorder fabrication, camera support 14 is moveable with respect to stand 13 to vary the distance between camera support 14 and baseboard 12. A camera 15 which comprises in its preferred form, a single lens reflex camera, includes an eyepiece 16 and a lens 17. Camera 15 is received by and supported upon camera support 14 in accordance with general fabrication techniques utilized in photo recorders.

In accordance with the invention, an optic guide 20 comprises a generally cylindrical light coupler 21 defining an exit orifice 80 coupled to eyepiece 16 and a lamp 22 in alignment with the major axis of cylindrical light coupler 21. Lamp 22 further includes a bulb support 25 and a pair of connecting wires 23 and 24. As is better seen in FIG. 3, lamp 22 includes a bulb 35 which, in its preferred form, comprises a Quartz Hallogen light and which receives electrical energy via wires 23 and 24.

In accordance with the invention and as is described below in greater detail, electrical energy applied to wires 23 and 24 causes the production of light energy within lamp 22. The light energy within lamp 22 is directed to light coupler 21 which, as set forth below in greater detail, directs the applied light to eyepiece 16 of camera 15. In accordance with the bilateral characteristics of the optics system of camera 15, the light produced by optic guide 20 and directed into eyepiece 16 travels through the optical system of camera 15 and emerges at lens 17. The output light from lens 17 indicated by light pattern 31 falls upon baseboard 12. In accordance with an important aspect of the present invention and as is described below in greater detail, the light passing through the optical system of camera 15 passes through the reticle (better seen in FIG. 3) of camera 15 and produces a plurality of reticle lines 32 upon baseboard 12 and object 18. In accordance with the invention, the position of camera support 14 is adjusted while viewing the boundaries of reticle lines 32 upon baseboard 12 until the desired training of object 18 results. With object 18 properly framed by reticle lines 82, the height of camera support 14 is fixed at the corresponding position. Thereafter, an adjustment of lens 17 produces the proper focusing of camera 15 upon object 18 by varying lens 17 rotationally until reticle lines 32 are sharply focused upon object 18. With the foregoing accomplished, camera 14 is now properly positioned and focused to record object 18. Routine functions of film advance and shutter operation take place to record the image of object 18 upon the film within camera 15 (not shown) in accordance with conventional photographic techniques.

It will be apparent to those skilled in the art that the present invention optic guide provides substantial advantage over prior art systems in that a substantially smaller lamp 22 is utilized as a light source. It will be further apparent to those skilled in the art that the construction of optic guide 20 places lamp 22 a substantial, but not critical, distance from camera 15 thereby protecting camera 15 and the sensitive film therein from excessive exposure to the heat of lamp 22.

FIG. 2 sets forth an enlarged view of a portion of photo recorder 10 shown in FIG. 1. As described above, optical guide 20 comprises a lamp 22 having a bulb support 25 from which a pair of electrical connecting wires 23 and 24 emerge. Optical guide 20 further includes a generally cylindrical coupler 21 defining a plurality of beveled facets 41 and an exit orifice 30. Coupler 21 further defines a cylindrical outer surface 26. In accordance with an important aspect of the present invention and as is set forth below in FIG. 3 in greater detail, cylindrical surface 26 and facets 41 support a reflective coating 40 which provides a light reflective surface about cylindrical surface 26 and facets 41. The function of reflective coating 40 is set forth below in greater detail. However, suffice it to note here that the presence of reflective coating 40 prohibits light produced by lamp 22 from escaping from light coupler 21 by any means other than passing through exit orifice 30. Accordingly, exit orifice 30 is light transmissive and is not covered by reflective coating 40. Camera 15, as described above, is a single lens reflex camera having an eyepiece 16 and an image lena 17. Camera support 14 is positioned beneath camera 15 and receives lens 17 through a suitably configured aperture (better seen in FIG. 3). It will be apparent to those skilled in the art that while support means for optic guide 20 are not set forth in the drawing figures for purposes of clarity, any number of conventional mechanical supports may be employed to properly position optic guide 20 with respect to eyepiece 16 to achieve the orientation set forth in FIGS. 1 through 3.

FIG. 3 sets forth a section view of the present invention optic guide 20 and camera 15 taken along section lines 3—3 in FIG. 1. Lamp 22 comprises a generally dome-shaped reflector 86 supporting a bulb support 25 within which a Quartz Hallogen lamp 35 is received and coupled to a pair of conducting wires 23 and 24. In accordance with conventional lamp fabrication techniques, the cooperation of lamp 35 and reflector 36 provides means by which the light energy produced by lamp 35 is reflected from reflector 36 and directed toward light coupler 21. In accordance with the invention, light coupler 21, in its preferred form, comprises a solid cylindrical bar of light transmissive plastic material. However, in the alternative it will be apparent to those skilled in the art that should the need arise, light coupler 21 may be fabricated from any number of optically transmissive substances or materials. Light coupler 21 defines a generally cylindrical outer surface 26 and a flat highly polished surface 41. In accordance with the invention, reflector 36 is sized to be received upon surface 41 and substantially cover all of surface 41. In further accordance with the invention, the high polishing of surface 41 provides efficient coupling of light energy from bulb 06 into the cylindrical body of light coupler 21. As described above, a reflective coating 40 surrounds and overlays surface 26 as well as the faceted portions of coupler 21. As is also described above, exit orifice 80 is sized to cooperate with eyepiece 16 and is highly polished for effective transmission of light energy.

Camera 15 includes a conventional single lens reflex camera having an outer body 50 which supports a plurality of internal components in accordance with conventional single lens reflex camera fabrication. While the representation of camera 15 set forth in FIG. 3 is a simplified drawing, it should be understood that the components shown therein are for purposes of illustration only and are representative of conventional more intricate camera construction. Accordingly, eyepiece 16 defines a plurality of focusing lens 45 and 46 which cooperate to direct the light passing through eyepiece 16 in accordance with the optics scheme of camera 15. A reticle or focusing screen 47 is positioned in the path of light transmitted through eyepiece 16. A pair of cooperating prisms 51 and 51a are supported within camera body 50 to reflect the light within camera body 50 through an offset path permitting the optical coupling between lens 17 and eyepiece 16. In accordance with conventional fabrication techniques, lens 17 includes a plurality of lens elements 52, 53 and 54 which are utilized to properly direct and focus the light passing through lens 17. As mentioned, lens elements 45 and 46 of eyepiece 16 as well as elements 52, 53 and 54 of lens 17 are representative of the optical components of camera 15 in a general manner. It will be equally apparent that any number of lens combinations may be utilized within the construction of camera 15.

In operation, the light produced by lamp 35 is transmitted to the optical coupling material of coupler 21 either directly or through reflection from reflector 36. Whether reflected or directly emanating from bulb 35, the light produced therefrom passes through surface 41 and is coupled by the transparent material of coupler 21. The portion of light entering coupler 21 which is not axially directed toward exit orifice 30 is repeatedly reflected from reflective surface 40 until it emerges from exit orifice 30. In other words, the cooperation of reflector 36 and reflective surfaces 40 assures that virtually all light energy produced by lamp 35 emerges after substantially internal reflection from exit orifice 30. The light emanating from exit orifice 30 is coupled by lenses 45 and 46 through reticle screen 47 to impinge 51a. In accordance with the conventional refractive properties of prism 51 and 51a, the emanating light is directed through lens elements 52, 53 and 54 and emerges from lens 17.

FIGS. 4 and 4a set forth an alternate embodiment of the present invention in which camera 15, camera support 14 and lamp 22 are constructed in the same manner as the embodiments set forth in FIGS. 1 through 3. The difference between the embodiment of FIGS. 1 through 3 and the alternate embodiment of FIGS. 4 and 4a resides in the use of a different coupler for coupling the light produced by lamp 22 to eyepiece 16 of camera 15. Accordingly, alternate embodiment optic light guide 51b includes a generally cylindrical light coupler 51 having a generally cylindrical portion 56 formed of a light transmissive or transparent material such as that shown for light coupler 21. Light coupler 51c further defines an exit orifice 55 adapted to couple to eyepiece 16. As can be seen in FIG. 4, exit orifice 55 is positioned with respect to cylindrical portion 56 such that exit orifice 55 is at right angles to cylindrical portion 56. A plurality of generally planar facets 60 through 66 are positioned with respect to cylindrical portion 56 to provide a generally sloped faceted arrangement. A curved surface 67 is coupled between facets 60 through 66 and exit orifice 55. As can be seen by simultaneous reference to FIGS. 4 and 4a, facets 60 through 66 and curved surface 67 cooperate to provide a transition between cylindrical portion 56 and exit orifice 55. In further similarity to the above-described preferred embodiment, coupler 51 is coated with a light reflective material on all portions of cylindrical surface 56, facets 60 through 66, and curved surface 67. In accordance with the invention, entrance surface 68 and exit orifice 55 are not coated with light reflective material, but are instead formed of highly polished light transmissive surfaces.

In operation, light produced by lamp 22 is passed through surface 68 and coupled by cylindrical portion 56 to be reflected against the interior of facets 60 through 66 and curved surface 67 to emerge at exit orifice 55. Thereafter, the light passing through exit orifice 55 enters camera 15 by eyepiece 16 and eventually exits through lens 17 in accordance with the above-described operation.

What has been shown is an improved light scattering optic guide for use with a single lens reflex camera in which the light source is remote from the camera and film therein and in which improved illumination of a projected reticle upon the photo recorder baseboard is achieved.

While particular objects of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a photorecorder in which a camera having an eyepiece, an internal focusing reticle and an image lens is supported in relation to a baseboard surface which supports a to-be-photographed object, a light scattering optic guide comprising:
   a light source;
   a light coupler formed of a transparent material having a generally cylindrical portion having an external surface, an entrance surface coupled to said light source, an exit surface coupled to said eyepiece and a plurality of facets arranged to transition said cylindrical portion to said exit surface; and
   a reflective coating formed on said exterior surface of said cylindrical portion and said plurality of facets.

2. A light scattering optic guide as set forth in claim 1 wherein said external surface is formed of a highly polished light transmissive surface.

3. A light scattering optic guide as set forth in claim 2 wherein said exit surface is formed of a highly polished light transmissive surface.

4. A light scattering optic guide as set forth in claim 3 wherein said generally cylindrical portion defines a major axis and wherein said entrance and exit surfaces define generally circular surfaces having centers aligned with said major axis of said generally cylindrical portion.

5. A light scattering optic guide as set forth in claim 4 wherein said plurality of facets each define respective first and second ends, said first ends of said plurality of facets being joined to said external surface of said cylindrical portion and said second ends of said plurality of facets being joined to said exit surface.

6. A light scattering optic guide as set forth in claim 5 wherein said light coupler is formed of a transparent plastic material.

7. A light scattering optic guide as set forth in claim 3 wherein said generally cylindrical portion defines a major axis and wherein said entrance surface defines a center aligned with said major axis and said exit surface is offset from said major axis.

8. A light scattering optic guide as set forth in claim 7 wherein said exit surface is perpendicular to said entrance surface.

9. A light scattering optic guide as set forth in claim 7 wherein said plurality of facets each define respective first and second ends, said first ends of said plurality of facets being joined to said external surface of said cylindrical portion and said second ends of said plurality of facets being joined to said exit surface.

10. A light scattering optic guide as set forth in claim 9 wherein said light coupler is formed of a transparent plastic material.

11. For use in coupling a light source to the eyepiece of a camera within a photorecorder, a light coupler comprising:
    a generally cylindrical member formed of a light transmissive material having a cylindrical outer surface, a first planar end surface coupled to the light source, a second end formed by a plurality of inwardly sloping facets and terminating in a second planar end surface; and
    a reflective layer supported by and upon said cylindrical outer surface and said plurality of facets.

12. A light coupler as set forth in claim 11 wherein said first planar end surface and said second planar end surface are aligned along a common axis.

* * * * *